United States Patent
Greenberger (10) Patent No.: US 9,595,142 B2
(45) Date of Patent: Mar. 14, 2017

(54) PAIRING A TOW VEHICLE AND A TRAILER

(71) Applicant: Traffilog Ltd., Rosh-Haayin (IL)

(72) Inventor: Arik Greenberger, Binyamina (IL)

(73) Assignee: TRAFFILOG LTD., Rosh Haayin (IL)

( * ) Notice: Subject to any disclaimer, the term of this patent is extended or adjusted under 35 U.S.C. 154(b) by 13 days.

(21) Appl. No.: 14/181,680

(22) Filed: Feb. 16, 2014

(65) Prior Publication Data

US 2015/0235481 A1 Aug. 20, 2015

(51) Int. Cl.
*B60D 1/24* (2006.01)
*G07C 5/08* (2006.01)
*B60D 1/00* (2006.01)

(52) U.S. Cl.
CPC .......... *G07C 5/08* (2013.01); *B60D 1/00* (2013.01)

(58) Field of Classification Search
CPC .................................................. H04W 84/02
See application file for complete search history.

(56) References Cited

U.S. PATENT DOCUMENTS

| 6,604,038 B1* | 8/2003 | Lesesky ............. G07C 5/008 340/988 |
| 2006/0028327 A1* | 2/2006 | Amis ................... B60D 1/62 340/431 |
| 2008/0221827 A1* | 9/2008 | Boesch ............... B60W 20/11 702/146 |
| 2009/0093928 A1* | 4/2009 | Getman ............... B60T 8/1755 701/37 |
| 2010/0085215 A1* | 4/2010 | Doyle, III ............. G08G 1/20 340/989 |
| 2010/0152920 A1* | 6/2010 | McCann ............. B60T 13/746 701/2 |
| 2014/0081543 A1* | 3/2014 | Fry ..................... B60T 8/323 701/70 |
| 2014/0081544 A1* | 3/2014 | Fry ..................... B60T 8/323 701/70 |
| 2014/0129060 A1* | 5/2014 | Cooper ............. B61L 15/0027 701/19 |
| 2015/0025766 A1* | 1/2015 | Mederer ............. B60T 8/1708 701/70 |
| 2015/0137482 A1* | 5/2015 | Woolf ................... B60D 1/24 280/448 |
| 2015/0172518 A1* | 6/2015 | Lucas ................. H04N 5/2251 348/148 |

* cited by examiner

Primary Examiner — Jonathan M Dager
(74) Attorney, Agent, or Firm — Reches Patents (57) ABSTRACT

A method for pairing between a tow vehicle and a trailer, the method may include receiving a tow vehicle event indication and a trailer event indication; wherein the tow vehicle event indication is generated by a tow vehicle monitor that is arranged to monitor the tow vehicle; wherein the trailer event indication is generated by a trailer monitor that is arranged to monitor the trailer; determining, in response to a relationship between the tow vehicle event indication and the trailer event indication, whether the tow vehicle event indication and the trailer event indication are associated with a same event; and pairing the trailer and the tow vehicle is it is determined that the tow vehicle event indication and the trailer event indication are associated with the same event.

18 Claims, 6 Drawing Sheets

PAIRING A TOW VEHICLE AND A TRAILER

BACKGROUND

Modern fleets of tow vehicles (such as trucks) and trailers are monitored by equipping each tow vehicle with a tow vehicle monitor and equipping each trailer with a trailer monitor. A non-limiting example of a state of the art monitor that can be used as a tow vehicle monitor and/or a trailer monitor is the TraffiView™ of Traffilog Ltd of Israel.

Over time the same tow vehicle can be used to tow different trailers and the same trailer can be towed by different tow vehicles.

There is a growing need to constantly determine which trailer is towed by which tow vehicle.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same.

Additional embodiments of the invention include a system arranged to execute any or all of the methods described in the specification above, including any stages—and any combinations of same.

According to an embodiment of the invention there is provided a method for pairing between a tow vehicle and a trailer, the method comprising: receiving a tow vehicle event indication and a trailer event indication; wherein the tow vehicle event indication is generated by a tow vehicle monitor that is arranged to monitor the tow vehicle; wherein the trailer event indication is generated by a trailer monitor that is arranged to monitor the trailer; determining, in response to a relationship between the tow vehicle event indication and the trailer event indication, whether the tow vehicle event indication and the trailer event indication are associated with a same event; and pairing the trailer and the tow vehicle is it is determined that the tow vehicle event indication and the trailer event indication are associated with the same event.

The method may include determining that the trailer event indication and the tow vehicle indication are associated with the same event if (a) both trailer event indication and the tow vehicle indication are associated with a same type of event, and if (b) timings of the trailer event indication and the tow vehicle indication are proximate to each other.

The method may include determining that the trailer event indication and the tow vehicle indication are associated with the same event if (a) both trailer event indication and the tow vehicle indication are associated with a same type of event, and if (b) timings of the trailer event indication and the tow vehicle indication are within a predetermined window that represents an expected time gap associated with an occurrence of a single event.

The pairing may be executed by a computerized system that is not connected to the tow vehicle and is not connected to the trailer.

The pairing may be executed by a computerized system that is connected to at least one out of the tow vehicle and the trailer.

The method may include delaying the determining of whether the tow vehicle event indication and the trailer event indication are associated with the same event if a confidence level associated with the determining is below a confidence threshold; receiving an additional tow vehicle event indication and an additional trailer event indication; and determining whether the additional tow vehicle event indication and the additional trailer event indication are associated with the same event.

The method may include receiving multiple tow vehicle event indications from a plurality of tow vehicle monitors that monitor a plurality of tow vehicles receiving multiple trailer event indications from a plurality of trailer monitors that monitor a plurality of trailers; determining, in response to relationships between the multiple tow vehicle event indications and the multiple trailer event indication, whether a pair of tow vehicle event indications and trailer event indications are associated with the same event; and pairing a trailers and a tow vehicle if it is determined that the tow vehicle event indication and the trailer event indication are associated with the same event.

The tow vehicle event indication may be indicative of an acceleration of the tow vehicle and wherein the trailer indication may be indicative of an acceleration of the trailer.

The tow vehicle event indication may be indicative of an attempt to slow the tow vehicle and wherein the trailer indication may be indicative of an attempt to slow the trailer.

The tow vehicle event indication and the trailer indication may be indicative of a same operation executed by a driver of the tow vehicle.

At least one of the tow vehicle event indication and the trailer indication may be responsive to a detection of a command conveyed over a communication link.

At least one of the tow vehicle event indication and the trailer indication may be responsive to a detection of radiation emitted in response an occurrence of the event.

According to an embodiment of the invention there may be provide a method for pairing between a tow vehicle and a trailer, the method may include detecting, by a trailer monitor arranged to monitor the trailer, an occurrence of an event; receiving, from a tow vehicle monitor that may be arranged to monitor the tow vehicle, a tow vehicle event indication; determining, in response to the tow vehicle event indication and to the detection of an occurrence of the event, whether the tow vehicle event indication may be associated with the event; and pairing the trailer and the tow vehicle if it is determined that the tow vehicle event indication may be associated with the event.

The method may include determining that the tow vehicle event indication is associated with the event if (a) the tow vehicle event indication is associated with a same event type as the event, and if (b) timings of the tow vehicle event indication and a timing of the occurrence of the event are proximate to each other.

The method may include determining that the tow vehicle event indication is associated with the event if (a) the tow vehicle event indication is associated with a same event type as the event, and if (b) timings of the tow vehicle event indication and a timing of the occurrence of the event are within a predetermined window that represents an expected time gap associated with an occurrence of a single event.

The method may include delaying the determining of whether the tow vehicle event indication is associated with the event if a confidence level associated with the determining is below a confidence threshold; receiving an additional tow vehicle event indication and detecting an occurrence of an additional event; and determining whether the additional tow vehicle event indication is associated with the additional event.

The method may include receiving multiple tow vehicle event indications from a plurality of tow vehicle monitors that monitor a plurality of tow vehicles; determining, in response to relationships between the multiple tow vehicle event indication and the detection of the event, which tow vehicle monitor should be paired with the trailer monitor.

The event detected by the trailer monitor may be an acceleration of the trailer and wherein the tow vehicle indication may be indicative of an acceleration of the tow vehicle.

The event detected by the trailer monitor an attempt to slow the trailer and wherein the tow vehicle indication may be indicative of an attempt to slow the tow vehicle.

The event detected by the trailer monitor and indicated by the tow vehicle indication may be related to a same operation executed by a driver of the trailer.

The event detected by the trailer monitor may be detected by a reception of a command conveyed over a communication link.

The event detected by the trailer monitor may be detected by monitoring radiation emitted in response the occurrence of the event.

According to an embodiment of the invention there is provide a method for pairing between a trailer and a tow vehicle, the method may include detecting, by a tow vehicle monitor arranged to monitor the tow vehicle, an occurrence of an event; receiving, from a trailer monitor that is arranged to monitor the tow vehicle, a trailer event indication; determining, in response to the trailer event indication and to the detection of an occurrence of the event, whether the trailer event indication is associated with the event; and pairing the tow vehicle and the trailer if it is determined that the trailer event indication is associated with the event.

The method may include determining that the trailer event indication may be associated with the event if (a) the trailer event indication may be associated with a same event type as the event, and if (b) timings of the trailer event indication and a timing of the occurrence of the event are proximate to each other.

The method may include determining that the trailer event indication may be associated with the event if (a) the trailer event indication may be associated with a same event type as the event, and if (b) timings of the trailer event indication and a timing of the occurrence of the event are within a predetermined window that represents an expected time gap associated with an occurrence of a single event.

The method may include: delaying the determining of whether the trailer event indication may be associated with the event if a confidence level associated with the determining may be below a confidence threshold; receiving an additional trailer event indication and detecting an occurrence of an additional event; and determining whether the additional trailer event indication may be associated with the additional event.

The method may include receiving multiple trailer event indications from a plurality of trailer monitors that monitor a plurality of trailers; and determining, in response to relationships between the multiple trailer event indication and the detection of the event, which trailer monitor should be paired with the tow vehicle monitor.

The event detected by the tow vehicle monitor may be an acceleration of the tow vehicle and wherein the trailer indication may be indicative of an acceleration of the trailer.

The event detected by the tow vehicle monitor may be an attempt to slow the tow vehicle and wherein the trailer indication may be indicative of an attempt to slow the trailer.

The event detected by the tow vehicle monitor and indicated by the trailer indication are related to a same operation executed by a driver of the tow vehicle.

The event detected by the tow vehicle monitor may be detected by a reception of a command conveyed over a communication link.

The event detected by the tow vehicle monitor may be detected by monitoring radiation emitted in response the occurrence of the event.

Any combination of any stage of any of the methods illustrated in the specification can be provided.

According to an embodiment of the invention there is provided a non-transitory computer readable medium that may store instructions that one executed by a computer may cause the computer to pair between a tow vehicle and a trailer, by: receiving a tow vehicle event indication and a trailer event indication; wherein the tow vehicle event indication is generated by a tow vehicle monitor that is arranged to monitor the tow vehicle; wherein the trailer event indication is generated by a trailer monitor that is arranged to monitor the trailer; determining, in response to a relationship between the tow vehicle event indication and the trailer event indication, whether the tow vehicle event indication and the trailer event indication are associated with a same event; and pairing the trailer and the tow vehicle is it is determined that the tow vehicle event indication and the trailer event indication are associated with the same event.

The non-transitory computer readable medium may store instructions for determining that the trailer event indication and the tow vehicle indication are associated with the same event if (a) both trailer event indication and the tow vehicle indication are associated with a same type of event, and if (b) timings of the trailer event indication and the tow vehicle indication are proximate to each other.

The non-transitory computer readable medium may store instructions for determining that the trailer event indication and the tow vehicle indication are associated with the same event if (a) both trailer event indication and the tow vehicle indication are associated with a same type of event, and if (b) timings of the trailer event indication and the tow vehicle indication are within a predetermined window that represents an expected time gap associated with an occurrence of a single event.

The pairing may be executed by a computerized system that is not connected to the tow vehicle and is not connected to the trailer.

The pairing may be executed by a computerized system that is connected to at least one out of the tow vehicle and the trailer.

The non-transitory computer readable medium may store instructions for delaying the determining of whether the tow vehicle event indication and the trailer event indication are associated with the same event if a confidence level associated with the determining is below a confidence threshold; receiving an additional tow vehicle event indication and an additional trailer event indication; and determining whether the additional tow vehicle event indication and the additional trailer event indication are associated with the same event.

The non-transitory computer readable medium may store instructions for receiving multiple tow vehicle event indications from a plurality of tow vehicle monitors that monitor a plurality of tow vehicles and receiving multiple trailer event indications from a plurality of trailer monitors that monitor a plurality of trailers; determining, in response to relationships between the multiple tow vehicle event indications and the multiple trailer event indication, whether a pair of tow vehicle event indications and trailer event indications are associated with the same event; and pairing a trailers and a tow vehicle if it is determined that the tow vehicle event indication and the trailer event indication are associated with the same event.

The tow vehicle event indication may be indicative of an acceleration of the tow vehicle and wherein the trailer indication may be indicative of an acceleration of the trailer.

The tow vehicle event indication may be indicative of an attempt to slow the tow vehicle and wherein the trailer indication may be indicative of an attempt to slow the trailer.

The tow vehicle event indication and the trailer indication may be indicative of a same operation executed by a driver of the tow vehicle.

At least one of the tow vehicle event indication and the trailer indication may be responsive to a detection of a command conveyed over a communication link.

At least one of the tow vehicle event indication and the trailer indication may be responsive to a detection of radiation emitted in response an occurrence of the event.

According to an embodiment of the invention there is a non-transitory computer readable medium that may store instructions for detecting, by a trailer monitor arranged to monitor the trailer, an occurrence of an event; receiving, from a tow vehicle monitor that is arranged to monitor the tow vehicle, a tow vehicle event indication; determining, in response to the tow vehicle event indication and to the detection of an occurrence of the event, whether the tow vehicle event indication is associated with the event; and pairing the trailer and the tow vehicle if it is determined that the tow vehicle event indication is associated with the event.

The non-transitory computer readable medium may store instructions for determining that the tow vehicle event indication is associated with the event if (a) the tow vehicle event indication is associated with a same event type as the event, and if (b) timings of the tow vehicle event indication and a timing of the occurrence of the event are proximate to each other.

The non-transitory computer readable medium may store instructions for determining that the tow vehicle event indication is associated with the event if (a) the tow vehicle event indication is associated with a same event type as the event, and if (b) timings of the tow vehicle event indication and a timing of the occurrence of the event are within a predetermined window that represents an expected time gap associated with an occurrence of a single event.

The non-transitory computer readable medium may store instructions for delaying the determining of whether the tow vehicle event indication is associated with the event if a confidence level associated with the determining is below a confidence threshold; receiving an additional tow vehicle event indication and detecting an occurrence of an additional event; and determining whether the additional tow vehicle event indication is associated with the additional event.

The non-transitory computer readable medium may store instructions for receiving multiple tow vehicle event indications from a plurality of tow vehicle monitors that monitor a plurality of tow vehicles; determining, in response to relationships between the multiple tow vehicle event indication and the detection of the event, which tow vehicle monitor should be paired with the trailer monitor.

The event detected by the trailer monitor may be an acceleration of the trailer and wherein the tow vehicle indication may be indicative of an acceleration of the tow vehicle.

The event detected by the trailer monitor an attempt to slow the trailer and wherein the tow vehicle indication may be indicative of an attempt to slow the tow vehicle.

The event detected by the trailer monitor and indicated by the tow vehicle indication may be related to a same operation executed by a driver of the trailer.

The event detected by the trailer monitor may be detected by a reception of a command conveyed over a communication link.

The event detected by the trailer monitor may be detected by monitoring radiation emitted in response the occurrence of the event.

According to an embodiment of the invention there is provided a non-transitory computer readable medium that may store instructions for detecting, by a tow vehicle monitor arranged to monitor the tow vehicle, an occurrence of an event; receiving, from a trailer monitor that is arranged to monitor the tow vehicle, a trailer event indication; determining, in response to the trailer event indication and to the detection of an occurrence of the event, whether the trailer event indication is associated with the event; and pairing the tow vehicle and the trailer if it is determined that the trailer event indication is associated with the event.

The non-transitory computer readable medium may store instructions for determining that the trailer event indication may be associated with the event if (a) the trailer event indication may be associated with a same event type as the event, and if (b) timings of the trailer event indication and a timing of the occurrence of the event are proximate to each other.

The non-transitory computer readable medium may store instructions for determining that the trailer event indication may be associated with the event if (a) the trailer event indication may be associated with a same event type as the event, and if (b) timings of the trailer event indication and a timing of the occurrence of the event are within a predetermined window that represents an expected time gap associated with an occurrence of a single event.

The non-transitory computer readable medium may store instructions for: delaying the determining of whether the trailer event indication may be associated with the event if a confidence level associated with the determining may be below a confidence threshold; receiving an additional trailer event indication and detecting an occurrence of an additional event; and determining whether the additional trailer event indication may be associated with the additional event.

The non-transitory computer readable medium may store instructions for: receiving multiple trailer event indications from a plurality of trailer monitors that monitor a plurality of trailers; and determining, in response to relationships between the multiple trailer event indication and the detection of the event, which trailer monitor should be paired with the tow vehicle monitor.

The event detected by the tow vehicle monitor may be an acceleration of the tow vehicle and wherein the trailer indication may be indicative of an acceleration of the trailer.

The event detected by the tow vehicle monitor may be an attempt to slow the tow vehicle and wherein the trailer indication may be indicative of an attempt to slow the trailer.

The event detected by the tow vehicle monitor and indicated by the trailer indication are related to a same operation executed by a driver of the tow vehicle.

The event detected by the tow vehicle monitor may be detected by a reception of a command conveyed over a communication link.

The event detected by the tow vehicle monitor may be detected by monitoring radiation emitted in response the occurrence of the event.

According to an embodiment of the invention there is provided a system such as a server or other computerized device that may include an interface, a processor and a memory, the system may be arranged to (a) receive a tow vehicle event indication and a trailer event indication; wherein the tow vehicle event indication is generated by a tow vehicle monitor that is arranged to monitor the tow vehicle; wherein the trailer event indication is generated by a trailer monitor that is arranged to monitor the trailer; (b) determine, in response to a relationship between the tow vehicle event indication and the trailer event indication, whether the tow vehicle event indication and the trailer event indication are associated with a same event; and (c) pair the trailer and the tow vehicle is it is determined that the tow vehicle event indication and the trailer event indication are associated with the same event.

The system may be arranged to determine that the trailer event indication and the tow vehicle indication are associated with the same event if (a) both trailer event indication and the tow vehicle indication are associated with a same type of event, and if (b) timings of the trailer event indication and the tow vehicle indication are proximate to each other.

The system may be arranged to determine that the trailer event indication and the tow vehicle indication are associated with the same event if (a) both trailer event indication and the tow vehicle indication are associated with a same type of event, and if (b) timings of the trailer event indication and the tow vehicle indication are within a predetermined window that represents an expected time gap associated with an occurrence of a single event.

The pairing may be executed by a computerized system that is not connected to the tow vehicle and is not connected to the trailer.

The pairing may be executed by a computerized system that is connected to at least one out of the tow vehicle and the trailer.

The system may be arranged to delay the determine of whether the tow vehicle event indication and the trailer event indication are associated with the same event if a confidence level associated with the determine is below a confidence threshold; receive an additional tow vehicle event indication and an additional trailer event indication; and determine whether the additional tow vehicle event indication and the additional trailer event indication are associated with the same event.

The system may be arranged to receiving multiple tow vehicle event indications from a plurality of tow vehicle monitors that monitor a plurality of tow vehicles receive multiple trailer event indications from a plurality of trailer monitors that monitor a plurality of trailers; determine, in response to relationships between the multiple tow vehicle event indications and the multiple trailer event indication, whether a pair of tow vehicle event indications and trailer event indications are associated with the same event; and pair a trailers and a tow vehicle if it is determined that the tow vehicle event indication and the trailer event indication are associated with the same event.

The tow vehicle event indication may be indicative of an acceleration of the tow vehicle and wherein the trailer indication may be indicative of an acceleration of the trailer.

The tow vehicle event indication may be indicative of an attempt to slow the tow vehicle and wherein the trailer indication may be indicative of an attempt to slow the trailer.

The tow vehicle event indication and the trailer indication may be indicative of a same operation executed by a driver of the tow vehicle.

At least one of the tow vehicle event indication and the trailer indication may be responsive to a detection of a command conveyed over a communication link.

At least one of the tow vehicle event indication and the trailer indication may be responsive to a detection of radiation emitted in response an occurrence of the event.

According to an embodiment of the invention there is provided a trailer monitor that may be arranged to (a) detect an occurrence of an event; (b) receive, from a tow vehicle monitor that is arranged to monitor the tow vehicle, a tow vehicle event indication; (c) determine, in response to the tow vehicle event indication and to the detection of an occurrence of the event, whether the tow vehicle event indication is associated with the event; and (d) pair the trailer and the tow vehicle if it is determined that the tow vehicle event indication is associated with the event.

The trailer monitor may be arranged to determine that the tow vehicle event indication is associated with the event if (a) the tow vehicle event indication is associated with a same event type as the event, and if (b) timings of the tow vehicle event indication and a timing of the occurrence of the event are proximate to each other.

The trailer monitor may be arranged to determine that the tow vehicle event indication is associated with the event if (a) the tow vehicle event indication is associated with a same event type as the event, and if (b) timings of the tow vehicle event indication and a timing of the occurrence of the event are within a predetermined window that represents an expected time gap associated with an occurrence of a single event.

The trailer monitor may be arranged to delay the determine of whether the tow vehicle event indication is associated with the event if a confidence level associated with the determine is below a confidence threshold; receive an additional tow vehicle event indication and detect an occurrence of an additional event; and determine whether the additional tow vehicle event indication is associated with the additional event.

The trailer monitor may be arranged to receive multiple tow vehicle event indications from a plurality of tow vehicle monitors that monitor a plurality of tow vehicles; determine, in response to relationships between the multiple tow vehicle event indication and the detection of the event, which tow vehicle monitor should be paired with the trailer monitor.

The event detected by the trailer monitor may be an acceleration of the trailer and wherein the tow vehicle indication may be indicative of an acceleration of the tow vehicle.

The event detected by the trailer monitor an attempt to slow the trailer and wherein the tow vehicle indication may be indicative of an attempt to slow the tow vehicle.

The event detected by the trailer monitor and indicated by the tow vehicle indication may be related to a same operation executed by a driver of the trailer.

The event detected by the trailer monitor may be detected by a reception of a command conveyed over a communication link.

The event detected by the trailer monitor may be detected by monitoring radiation emitted in response the occurrence of the event.

According to an embodiment of the invention there is provided a tow vehicle monitor that is arranged to (a) detect an occurrence of an event; (b) receive, from a trailer monitor that is arranged to monitor the tow vehicle, a trailer event indication; (c) determine, in response to the trailer event indication and to the detection of an occurrence of the event, whether the trailer event indication is associated with the event; and (d) pair the tow vehicle and the trailer if it is determined that the trailer event indication is associated with the event.

The tow vehicle monitor may be arranged to determine that the trailer event indication is associated with the event if (a) the trailer event indication is associated with a same event type as the event, and if (b) timings of the trailer event indication and a timing of the occurrence of the event are proximate to each other.

The tow vehicle monitor may be arranged to determine that the trailer event indication is associated with the event if (a) the trailer event indication is associated with a same event type as the event, and if (b) timings of the trailer event indication and a timing of the occurrence of the event are within a predetermined window that represents an expected time gap associated with an occurrence of a single event.

The tow vehicle monitor may be arranged to delay the determining of whether the trailer event indication is associated with the event if a confidence level associated with the determine is below a confidence threshold; receive an additional trailer event indication and detecting an occurrence of an additional event; and determine whether the additional trailer event indication is associated with the additional event.

The tow vehicle monitor may be arranged to receive multiple trailer event indications from a plurality of tow vehicle monitors that monitor a plurality of trailers and determine, in response to relationships between the multiple trailer event indication and the detection of the event, which tow vehicle monitor should be paired with the tow vehicle monitor.

The event detected by the tow vehicle monitor is an acceleration of the tow vehicle and wherein the trailer indication is indicative of an acceleration of the trailer.

The event detected by the tow vehicle monitor may be an attempt to slow the tow vehicle and wherein the trailer indication may be indicative of an attempt to slow the trailer.

The event detected by the tow vehicle monitor and indicated by the trailer indication may be related to a same operation executed by a driver of the tow vehicle.

The event detected by the tow vehicle monitor may be detected by a reception of a command conveyed over a communication link.

The event detected by the tow vehicle monitor may be detected by monitoring radiation emitted in response the occurrence of the event.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there is provided a system, method and a computer readable medium for pairing a trailer and a tow vehicle.

An event (including a tow vehicle event and a trailer event) may be sensed by detecting one or more event indications. An event indication may be a signal (a command, an alert), transmitted between components of a tow vehicle or trailer, may be a byproduct of the event, and the like. For example—an event can be pressing a brake paddle by a driver and the event indications may include commands sent to the brakes to slow the trailer and/or tow vehicle, turning on the light brakes and the like.

A pairing of a trailer and a tow vehicle may involve marking or otherwise tagging the trailer as being connected to a tow vehicle. In addition, the pairing allows a correlating between information obtained from a tow vehicle monitor that monitors a tow vehicle and a trailer monitor that monitors a trailer that is connected to the tow vehicle, it may allow exchange of information and/or commands between monitors of paired trailers and tow vehicles.

Non-limiting example for such a correlation between information obtained from a tow vehicle monitor and between information obtained by a trailer monitor includes:

A. Assigning a higher certainty level to a detection of an event that is detected by the trailer monitor and the (paired) tow vehicle monitor.

B. Assigning a lower certainty level to a detection of an event that is detected by only one of the trailer monitor and the (paired) tow vehicle monitor.

If an event that should be detected by both monitors is detected only by a single monitor—this may trigger an alert or in a need to evaluate the pairing (in case of an erroneous pairing) or check why only one monitor detected the event (maybe a monitor or a vehicle component malfunctioned).

Figure 1:
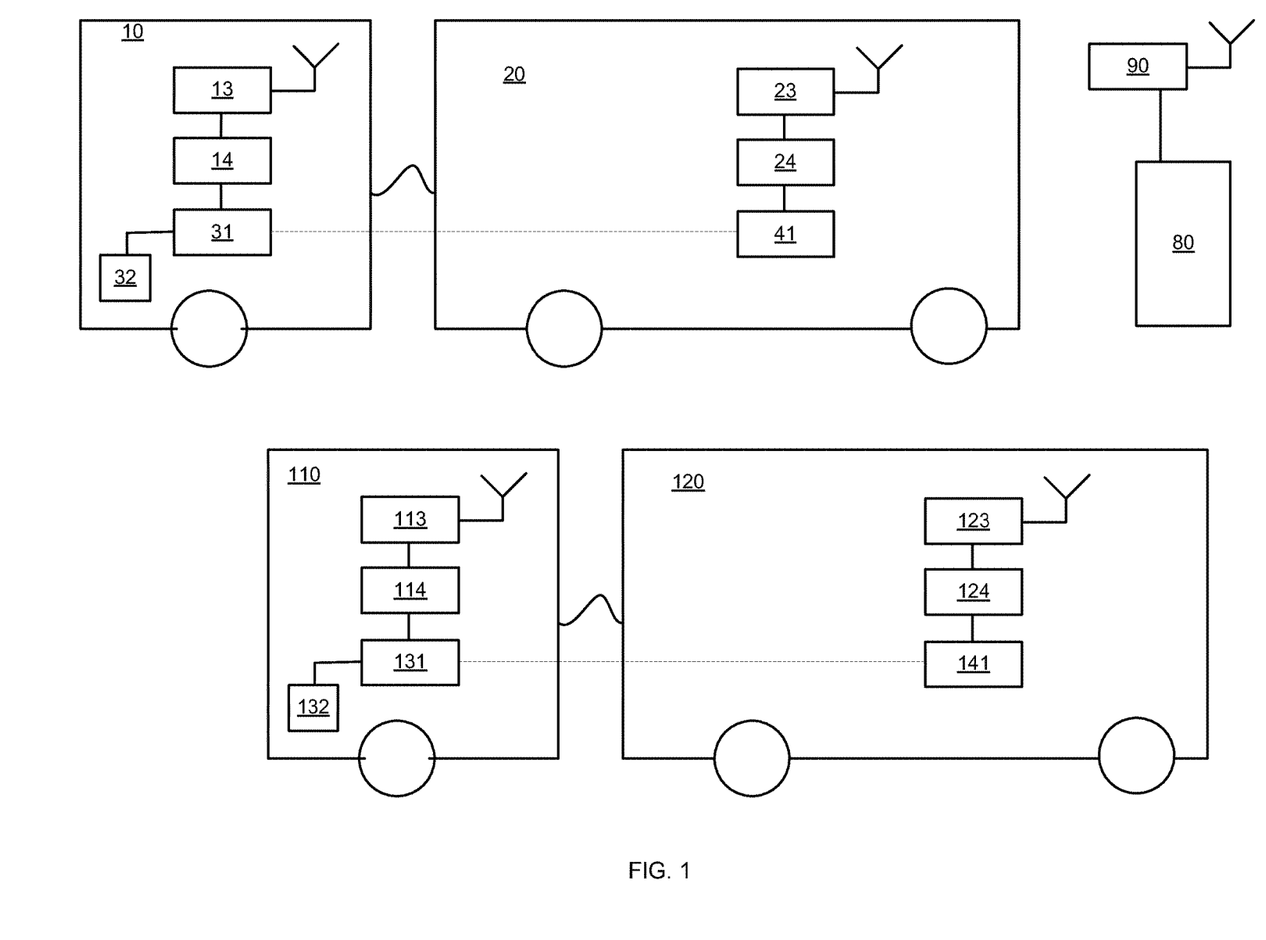
FIG. 1 illustrates tow vehicles, trailers and a computerized system according to an embodiment of the invention.

FIG. 1 illustrates a first tow vehicle 10, a first trailer 20, a second tow vehicle 110, a second trailer 120 and a server 80 according to an embodiment of the invention.

The first tow vehicle 10 is illustrated as including a first tow vehicle sensor 32, a first tow vehicle controller 31, a first tow vehicle monitor 14, and a first tow vehicle transceiver 13.

The first trailer 20 is illustrated as including a first trailer controller 41, a first trailer monitor 24 and a first trailer transceiver 23.

The first tow vehicle sensor 32 can sense, for example, an indication of an occurrence of an event related to the tow vehicle. For example—the event may include pushing or releasing a paddle (a brake paddle, a gas paddle or a gear peddle) by a driver, an acceleration or deceleration of the tow vehicle, and the like. The first tow vehicle sensor 32 may sense the status of any (or at least some) of the components of the first tow vehicle.

In response to the detection—the first tow vehicle sensor 32 may send a detection message to the first tow vehicle controller 31.

The first tow vehicle monitor 14 can intercept the detection message or otherwise receive information (for example—from a communication port of the first tow vehicle controller 31) about the detection message.

Then, the first tow vehicle monitor 14 may generate a first tow vehicle event indication that informs about an occurrence of a first tow vehicle event. The first tow vehicle event indication is sent to the first tow vehicle transceiver 13. The first tow vehicle transceiver 13 may wirelessly transmit the first tow vehicle event indication towards a wireless network (not shown). A remote server (such as server 80 connected to transceiver 90) may receive the first tow vehicle event indication.

The first trailer sensor 32 can sense, for example, an indication of an occurrence of an event related to the trailer. For example—the event may include pushing or releasing a paddle (a brake paddle, a gas paddle or a gear peddle) by a driver that causes the trailer controller 41 to receive a command (from the first tow vehicle controller 31) to press or release brakes.

The first trailer monitor 14 can intercept the command or otherwise receive information (for example—from a communication port of the first trailer controller 41) about the command.

Then, the first trailer monitor 14 may generate a first trailer event indication that informs about an occurrence of a first trailer event and is sent to first trailer transceiver 23.

The first trailer transceiver 23 may wirelessly transmit the first trailer event indication towards a wireless network (not shown). A remote server (such as server 80 connected to transceiver 90) may receive the first trailer event indication.

The second tow vehicle 110 is illustrated as including a second tow vehicle sensor 132, a second tow vehicle controller 131, a second tow vehicle monitor 141, and a tow monitor transceiver 113.

The second trailer 120 is illustrated as including a second trailer controller 141, a second trailer monitor 124 and a second trailer transceiver 123.

The first trailer monitor 24 and the second trailer monitor 124 may include hardware components such as general purpose processors, dedicated hardware and the like. Each monitor can execute software, firmware or middleware during the monitoring process.

The second tow vehicle sensor 132 can sense, for example, an indication of an occurrence of an event related to the second tow vehicle. For example—the event may include pushing or releasing a paddle (a brake paddle, a gas paddle or a gear peddle) by a driver, an acceleration or deceleration of the tow vehicle, and the like. The second tow vehicle sensor 132 may sense the status of any (or at least some) of the components of the second tow vehicle.

In response to the detection—the second tow vehicle sensor 132 may send a detection message to the second tow vehicle controller 131.

The second tow vehicle monitor 114 can intercept the detection message or otherwise receive information (for example—from a communication port of the second tow vehicle controller 131) about the detection message.

Then, the second tow vehicle monitor 114 may generate a second tow vehicle event indication that informs about an occurrence of a second tow vehicle event and sent it to second tow vehicle transceiver 113. The second tow vehicle transceiver 113 may wirelessly transmit the second tow vehicle event indication towards a wireless network (not shown). A remote server (such as server 80 connected to transceiver 90) may receive the second tow vehicle event indication.

The second trailer sensor 132 can sense, for example, an indication of an occurrence of an event related to the trailer. For example—the event may include pushing or releasing a paddle (a brake paddle, a gas paddle or a gear peddle) by a driver that causes the trailer controller 141 to receive a command (from the second tow vehicle controller 131) to press or release brakes.

The second trailer monitor 114 can intercept the command or otherwise receive information (for example—from a communication port of the second trailer controller 141) about the command.

Then, the second trailer monitor 114 may generate a second trailer event indication that informs about an occurrence of a second trailer event and sent it to second trailer transceiver 123.

The second trailer transceiver 123 may wirelessly transmit the second trailer event indication towards a wireless network (not shown). A remote server (such as server 80 connected to transceiver 90) may receive the second trailer event indication.

The server 80 may be arranged to pair the first tow vehicle 10 to the first trailer 20 and to pair the second tow vehicle 110 to the second trailer 120 by processing the different indications it receives.

Figure 2:
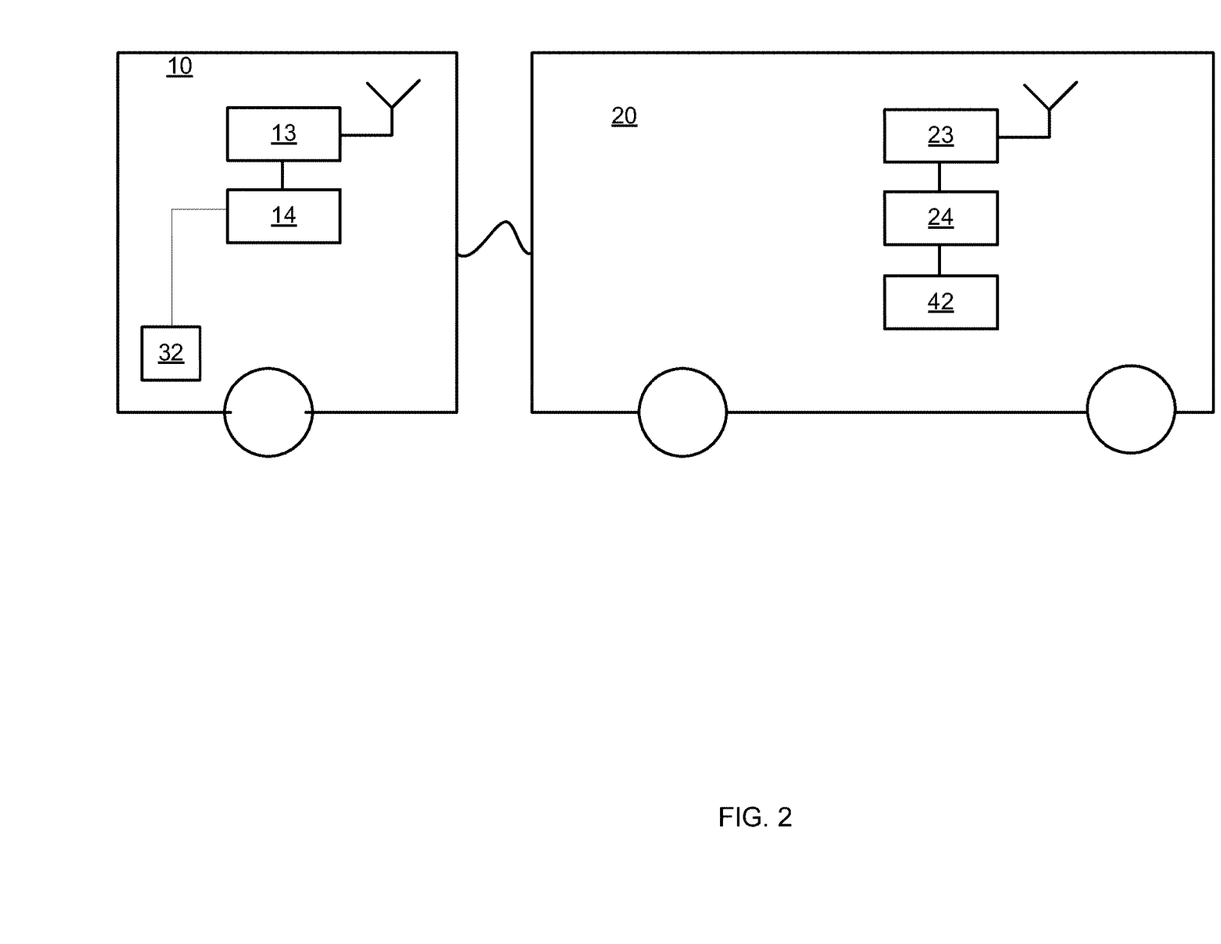
FIG. 2 illustrates a tow vehicle and a trailer according to an embodiment of the invention.

FIG. 2 illustrates a first tow vehicle 10 and a first trailer 20 according to another embodiment of the invention.

In this figure the first tow vehicle monitor 14 is coupled to the first tow vehicle sensor 32 and receives from the first tow vehicle sensor 32 detection messages indicative of the occurrence of first tow vehicle events.

In this figure a second trailer monitor 24 is coupled to the second trailer sensor 42 and receives from the second trailer sensor 42 detection messages indicative of the occurrence of second trailer events.

Figure 3:
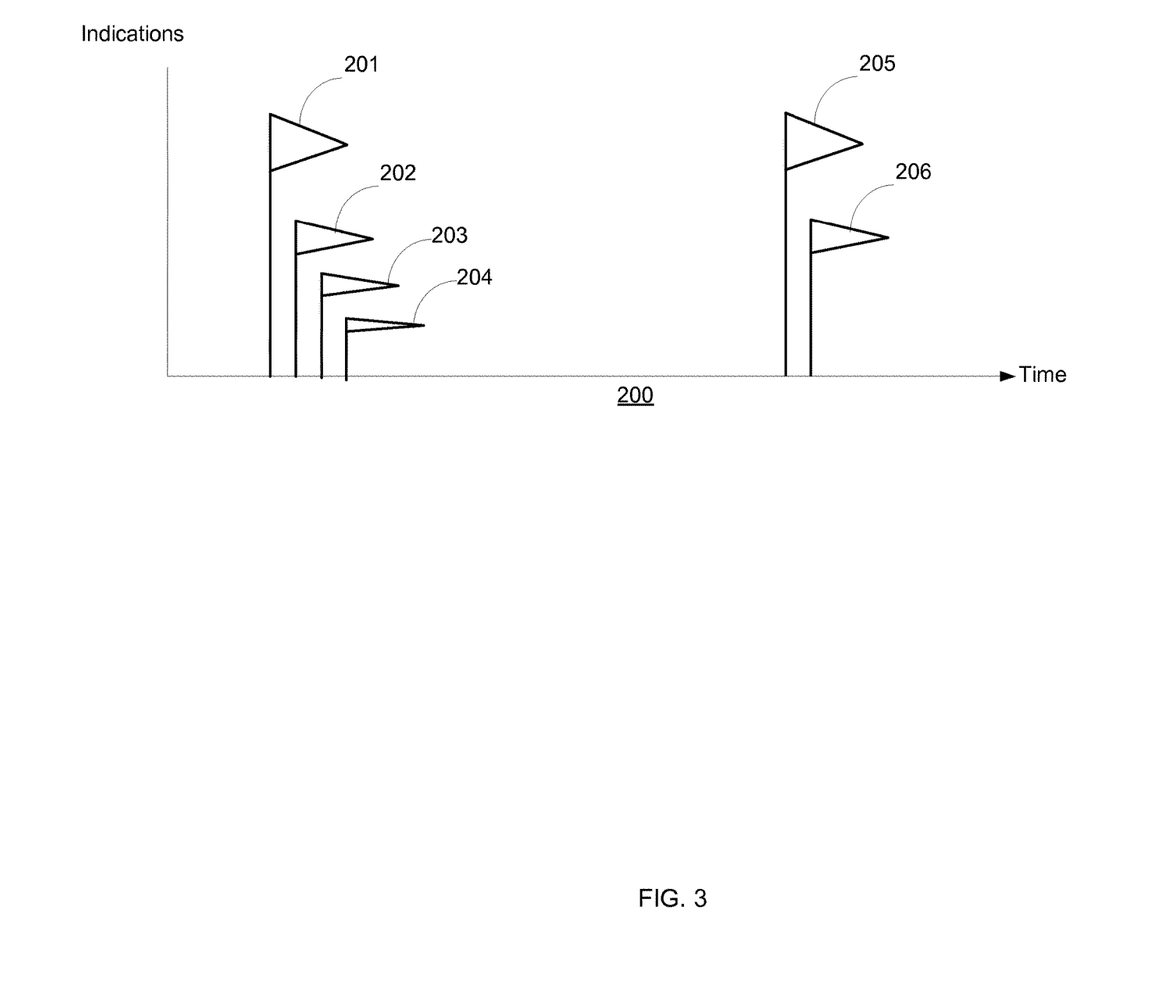
FIG. 3 is a timing diagram according to an embodiment of the invention.

FIG. 3 is a timing diagram 200 according to an embodiment of the invention.

Timing diagram 200 illustrates a reception by a computerized system (such as server 80 of FIG. 1) of a first group of event indications (including event indications 201, 202, 203 204) and a second group of event indications (including event indications 205 and 206).

The first group of event indications includes event indications that 201-204 that are proximate to each other—they are received within few seconds or a fraction of second from each other and the second group of event indications includes event indications 205 and 206 that are proximate to each other.

The following table provides various example of pairing decisions that can be made based upon the content of the event indicators. It is assumed that first event indication 201 is a first tow vehicle event indicator, that second event indication 202 is a first trailer event indicator, that third event indication 203 is a second tow vehicle event indicator and that fourth indicator 204 is a second trailer event indicator.

TABLE 1

| 201 | 202 | 203 | 204 | Decision |
|---|---|---|---|---|
| First type of event | Second type of event | First type of event | First type of event | Pair second trailer and second tow vehicle |
| First type of event | First type of event | First type of event | First type of event | Await to next event indicators (for example 205 and 206) - due to proximity of event indicators and same type of event detection |
| First type of event | First type of event | Third type of event | First type of event | Pair first trailer and first tow vehicle |

Figure 4:
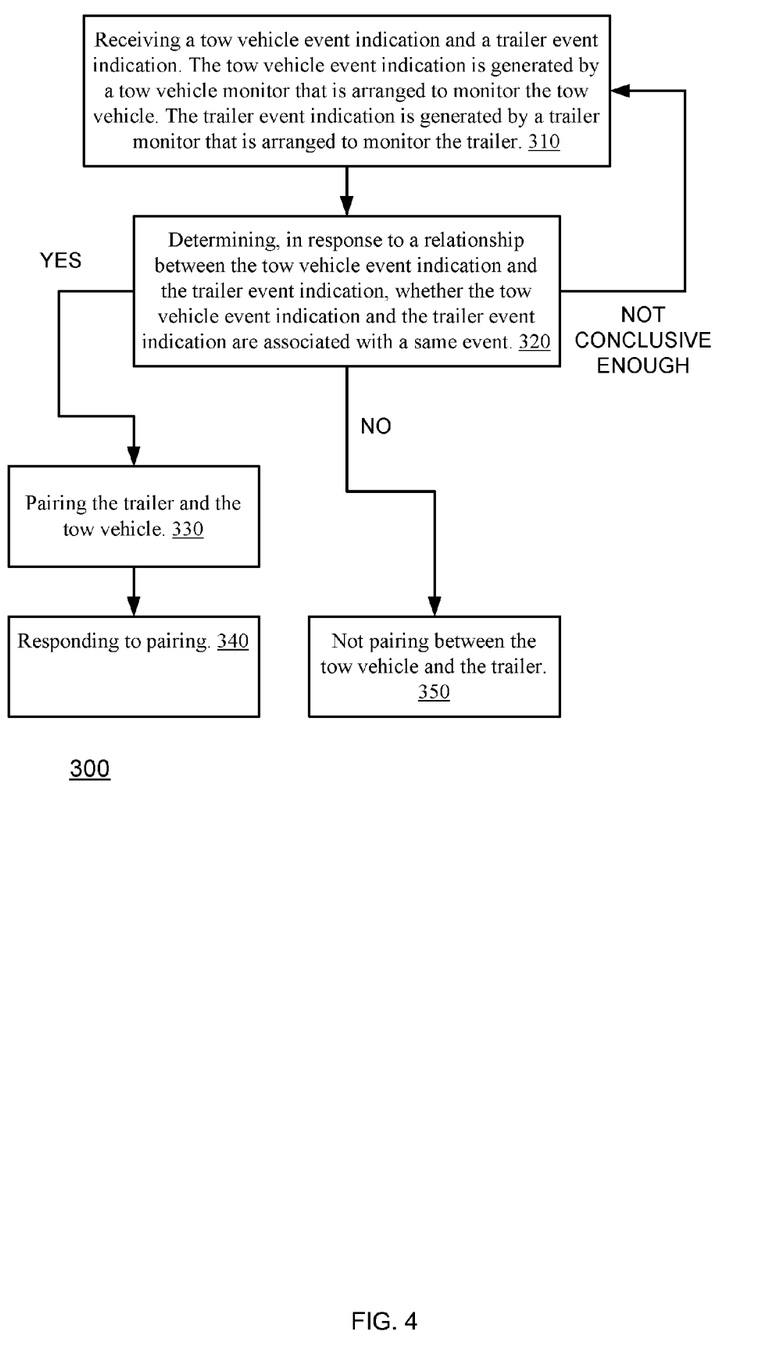
FIG. 4 illustrates a method according to an embodiment of the invention.

FIG. 4 illustrates method 300 according to an embodiment of the invention.

Method 300 may start by stage 310 of receiving a tow vehicle event indication and a trailer event indication. The tow vehicle event indication is generated by a tow vehicle monitor that is arranged to monitor the tow vehicle. The trailer event indication is generated by a trailer monitor that is arranged to monitor the trailer.

At least one of the tow vehicle event indication and the trailer indication is responsive to a detection of a command conveyed over a communication link. The command can be a CAN BUS compliant command or any other type of command. The command can be sent between a controller and a component controlled by the controller or configured to provide information to the controller. The controller may be a trailer controller and/or a tow vehicle controller.

Yet according to an embodiment of the invention, at least one of the tow vehicle event indication and the trailer indication can be responsive to a detection of radiation emitted in response an occurrence of the event. For example, the radiation may be light emitted from brake lights or from other lights, heat dissipated from the brakes when the brakes attempt to slow the trailer and/or the tow vehicle, and the like.

The tow vehicle event indication may be received by monitoring an outcome of an accelerometer, a speedometer, a temperature sensor or any other sensor of the tow vehicle. The monitoring may include monitoring acceleration, speed, temperature and the like.

The trailer event indication may be received by monitoring an outcome of an accelerometer, a speed sensor, a temperature sensor or any other sensor of the trailer. The monitoring may include monitoring acceleration, speed, temperature and the like.

Stage 310 may be followed by stage 320 of determining, in response to a relationship between the tow vehicle event indication and the trailer event indication, whether the tow vehicle event indication and the trailer event indication are associated with a same event.

Stage 320 may include determining that the trailer event indication and the tow vehicle indication are associated with the same event if (a) both trailer event indication and the tow vehicle indication are associated with a same type of event, and if (b) timings of the trailer event indication and the tow vehicle indication are proximate to each other.

The term proximate may refer to a time period that is shorter than few (1-10) seconds and even shorter than a second. Other time frames may be provided and should be determined based upon expected behavior of the tow vehicle and the trailer. For example, time periods that may exceed few seconds may be expected when the tow vehicle is a tug-boat and the trailer is a boat (such as but not limited to a barge).

The term proximate can be selected such as to differentiate between detection of different indications associated with the same event and different events. Statistically, events occurring in different vehicles occur at different points of time. If multiple events occurring in different vehicles occur at the same time then the determination process can wait to get other indications about the occurrence of other events.

According to an embodiment of the invention the proximity can be regarded as falling within a predefined time window. The length of the predefined time window can be determined based upon expected timing differences between a detection of different indications of the same events by different monitors. The expected timing differences may reflect differences in the response time of different monitors, expected delays resulting from the relay of messages between a tow vehicle and a trailer, expected mechanical delays between movements of the tow vehicle and the trailer and the like.

For example—if both the trailer event indication and the tow vehicle indication are indicative of an acceleration (even substantially the same acceleration) of the tow vehicle and the trailer at substantially the same time—then it may be concluded that the acceleration of the trailer results from the acceleration of the tow vehicle and both monitors monitored the same event (acceleration).

Yet for another example—when a driver of the tow vehicle pushes the brake paddle then both the tow vehicle monitor and the trailer monitor should detect indications of this event and it is expected that this will result in concurrent commands that are aimed to the brakes of the tow vehicle and the trailer to stop the tow vehicle and the trailer.

If it is determined that the tow vehicle event indication and the trailer event indication are associated with the same event then stage 320 is followed by stage 330 of pairing the trailer and the tow vehicle.

Stage 330 of pairing may be executed by a computerized system (such as server 80 of FIG. 1) that is not connected to the tow vehicle and is not connected to the trailer.

Alternatively, stage 330 may be executed by a computerized system that is connected to the trailer or to the tow vehicle. The computerized system may be one of the monitors, a controller of the trailer or of the tow vehicle and the like.

Stage 330 may be followed by stage 340 of responding to pairing. This may include correlating future indications provided by the tow vehicle monitor and the trailer monitor, allowing an exchange of information and/or commands between the monitors of the tow vehicle and the trailer, providing an indication to a driver of the tow vehicle (or another party) that the tow vehicle is paired to the trailer, and the like.

If it is determined that the tow vehicle event indication and the trailer event indication are not associated with the same event then stage 320 may be followed by stage 350 of not pairing between the tow vehicle and the trailer.

Stage 320 may also include concluding that the determination is not certain enough and jumping to stage 310 in order to receive an additional tow vehicle event indication and an additional trailer event indication.

Although FIG. 4 illustrates a reception of a single tow vehicle event indicator and a single trailer event indicator, stage 310 may include receiving multiple tow vehicle event indications from a plurality of tow vehicle monitors that monitor a plurality of tow receiving multiple trailer event indications from a plurality of trailer monitors that monitor a plurality of trailers.

Stage 320 may include determining, in response to relationships between the multiple tow vehicle event indications and the multiple trailer event indication, whether a pair of (a) a tow vehicle event indication and (b) a trailer event indication are associated with the same event.

Stage 330 may include pairing a trailer and a tow vehicle if it is determined that the tow vehicle event indication and the trailer event indication are associated with the same event.

Stage 330 may be followed by stage 340 of responding to the pairing.

Figure 5:
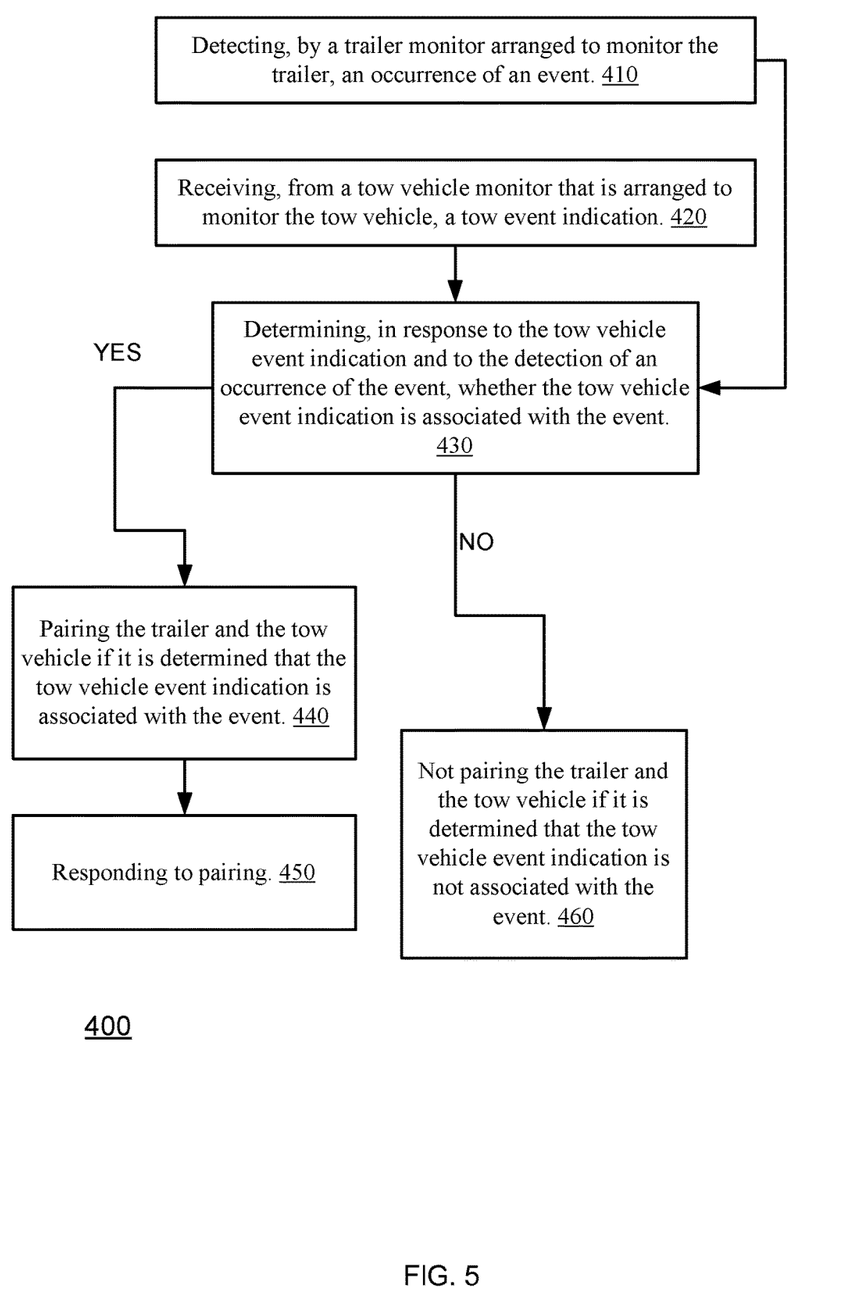
FIG. 5 illustrates a method according to an embodiment of the invention.

FIG. 5 illustrates method 400 for pairing between a tow vehicle and a trailer, according to an embodiment of the invention. Method 400 may be executed by the trailer monitor.

Method 400 may start by stages 410 and 420. Stage 410 may include detecting, by a trailer monitor arranged to monitor the trailer, an occurrence of an event.

Stage 420 may include receiving, from a tow vehicle monitor that is arranged to monitor the tow vehicle, a tow vehicle event indication.

Stages 410 and 420 may be followed by stage 430 of determining, in response to the tow vehicle event indication and to the detection of an occurrence of the event, whether the tow vehicle event indication is associated with the event.

Stage 430 may also include concluding that the determination is not certain enough and jumping to stages 410 and 420 in order to receive an additional tow vehicle event indication and/or to detect another trailer event.

Stage 430 may be followed by stage 440 of pairing the trailer and the tow vehicle if it is determined that the tow vehicle event indication is associated with the event.

Stage 440 may be followed by stage 450 of responding to pairing. This may include correlating future indications provided by the tow vehicle monitor and the trailer monitor, allowing an exchange of information and/or commands between the monitors of the tow vehicle and the trailer, providing an indication to a driver of the tow vehicle (or another party) that the tow vehicle is paired to the trailer, and the like.

Stage 430 may be followed by stage 460 of not pairing the trailer and the tow vehicle if it is determined that the tow vehicle event indication is not associated with the event.

Figure 6:
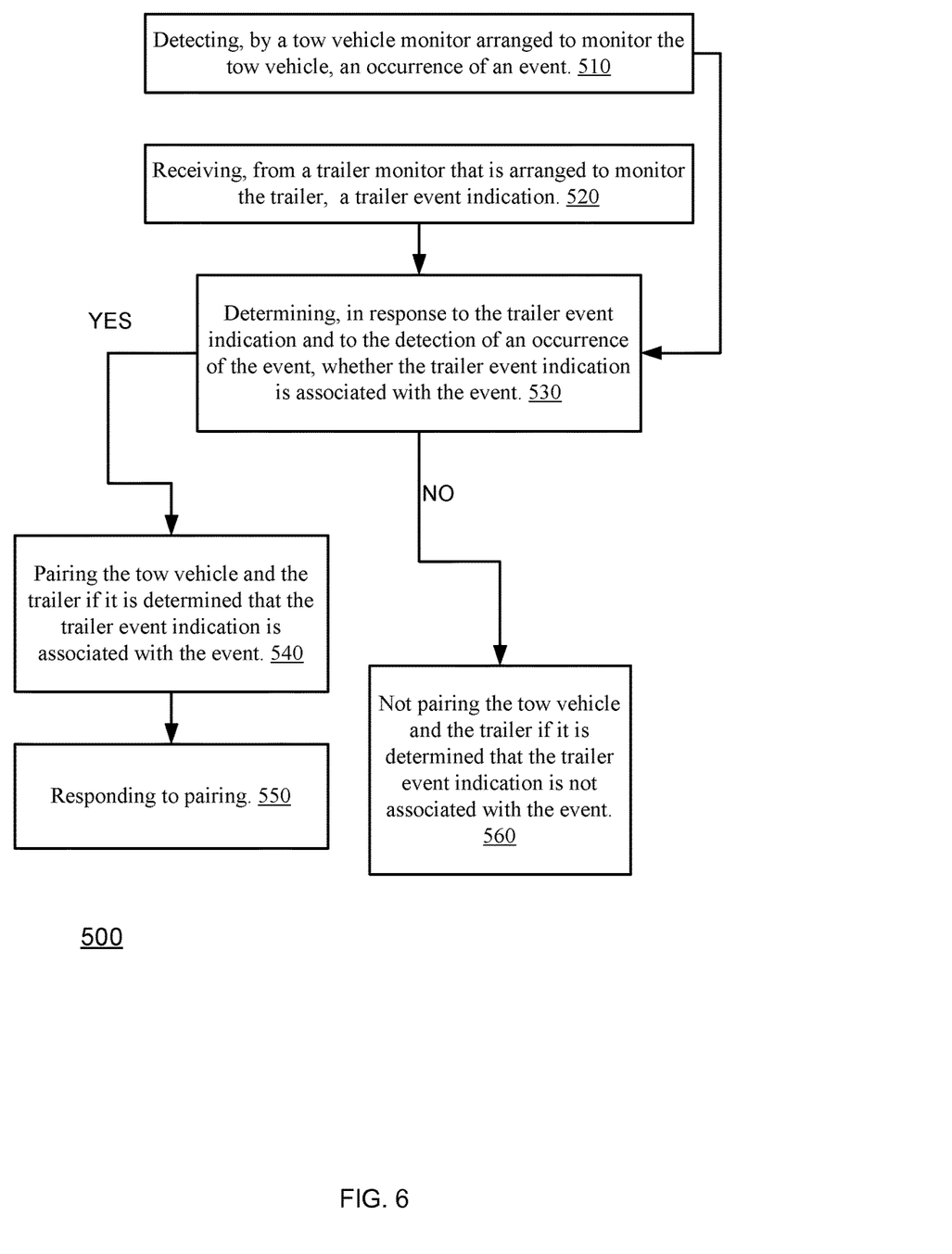
FIG. 6 illustrates a method according to an embodiment of the invention.

FIG. 6 illustrates method 500 for pairing between a trailer and a tow vehicle, according to an embodiment of the invention.

Method 500 may be executed by the tow vehicle monitor.

Method 500 may start by stages 510 and 520.

Stage 510 may include detecting, by a tow vehicle monitor arranged to monitor the tow vehicle, an occurrence of an event.

Stage 520 may include receiving, from a trailer monitor that is arranged to monitor the trailer, a trailer event indication.

Stages 510 and 520 may be followed by stage 530 of determining, in response to the trailer event indication and to the detection of an occurrence of the event, whether the trailer event indication is associated with the event.

Stage 530 may also include concluding that the determination is not certain enough and jumping to stages 510 and 520 in order to receive an additional trailer event indication and/or to detect another tow vehicle event.

Stage 530 may be followed by stage 540 of pairing the tow vehicle and the trailer if it is determined that the trailer event indication is associated with the event.

Stage 540 may be followed by stage 550 of responding to pairing. This may include correlating future indications provided by the tow vehicle monitor and the trailer monitor.

Stage 530 may be followed by stage 560 of not pairing the tow vehicle and the trailer if it is determined that the trailer event indication is not associated with the event.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. Alternatively, the computer system may be implemented by a FPGA.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for pairing between a tow vehicle and a trailer, the method comprising:
receiving a tow vehicle event indication and a trailer event indication;
wherein the tow vehicle event indication is generated by a tow vehicle monitor that is arranged to monitor the tow vehicle; wherein the trailer event indication is generated by a trailer monitor that is arranged to monitor the trailer;
determining, in response to a relationship between the tow vehicle event indication and the trailer event indication, whether the tow vehicle event indication and the trailer event indication are associated with a same event; and pairing the trailer and the tow vehicle if it is determined that the tow vehicle event indication and the trailer event indication are associated with the same event; and wherein the method comprises determining that the trailer event indication and the tow vehicle indication are associated with the same event if (a) both trailer event indication and the tow vehicle indication are associated with a same type of event, and if (b) timings of the trailer event indication and the tow vehicle indication are proximate to each other.

2. The method according to claim, 1 wherein the pairing is executed by a computerized system that is connected to at least one out of the tow vehicle and the trailer.

3. The method according to claim 1, comprising:
delaying the determining of whether the tow vehicle event indication and the trailer event indication are associated with the same event if a confidence level associated with the determining is below a confidence threshold;
receiving an additional tow vehicle event indication and an additional trailer event indication; and
determining whether the additional tow vehicle event indication and the additional trailer event indication are associated with the same event.

4. The method according to claim 1 comprising:
receiving multiple tow vehicle event indications from a plurality of tow vehicle monitors that monitor a plurality of tow vehicles;
receiving multiple trailer event indications from a plurality of trailer monitors that monitor a plurality of trailers;
determining, in response to relationships between the multiple tow vehicle event indications and the multiple trailer event indication, whether a pair of tow vehicle event indications and trailer event indications are associated with the same event; and
pairing a trailers and a tow vehicle if it is determined that the tow vehicle event indication and the trailer event indication are associated with the same event.

5. The method according to claim 1 wherein the tow vehicle event indication and the trailer indication are indicative of a same operation executed by a driver of the tow vehicle.

6. The method according to claim 1 wherein at least one of the tow vehicle event indication and the trailer indication is responsive to a detection of a command conveyed over a communication link.

7. The method according to claim 1 wherein at least one of the tow vehicle event indication and the trailer indication is responsive to a detection of the radiation emitted in response an occurrence of the event.

8. A method for pairing between a trailer and a tow vehicle, the method comprising:
detecting, by a tow vehicle monitor arranged to monitor the tow vehicle, an occurrence of an event;
receiving, from a trailer monitor that is arranged to monitor the tow vehicle, a trailer event indication;
determining, in response to the trailer event indication and to the detection of an occurrence of the event, whether the trailer event indication is associated with the event; and
pairing the tow vehicle and the trailer if it is determined that the trailer event indication is associated with the event; and wherein
the method comprises determining that the trailer event indication is associated with the event if (a) the trailer event indication is associated with the same event type as the event, and if (b) the timings of the trailer event indication and the occurrence of the event are within a predetermined window that represents an expected time gap associated with an occurrence of a single event.

9. The method according to claim 8, comprising: delaying the determining of whether the trailer event indication is associated with the event if a confidence level associated with the determining is below a confidence threshold; receiving an additional trailer event indication and detecting an occurrence of an additional event; and determining whether the additional trailer event indication is associated with the additional event.

10. The method according to claim 8 comprising:
receiving multiple trailer event indications from a plurality of trailer monitors that monitor a plurality of trailers;
determining, in response to relationships between the multiple trailer event indication and the detection of the event, which trailer monitor should be paired with the tow vehicle monitor.

11. The method according to claim 8 wherein the event detected by the tow vehicle monitor and indicated by the trailer indication are related to a same operation executed by a driver of the tow vehicle.

12. The method according to claim 8 wherein the event detected by the tow vehicle monitor is detected by a reception of a command conveyed over a communication link.

13. The method according to claim 8 wherein the event detected by the tow vehicle monitor is detected by monitoring the radiation emitted in response the occurrence of the event.

14. A method for pairing between a tow vehicle and a trailer, the method comprising:
detecting, by a trailer monitor arranged to monitor the trailer, an occurrence of an event;
receiving, from a tow vehicle monitor that is arranged to monitor the tow vehicle, a tow vehicle event indication;
determining, in response to the tow vehicle event indication and to the detection of an occurrence of the event, whether the tow vehicle event indication is associated with the event; and
pairing the trailer and the tow vehicle if it is determined that the tow vehicle event indication is associated with the event; and wherein
the event detected by the trailer monitor is detected by monitoring radiation emitted in response the occurrence of the event.

15. The method according to claim 14, comprising: delaying the determining of whether the trailer event indication is associated with the event if a confidence level associated with the determining is below a confidence threshold; receiving an additional trailer event indication and detecting an occurrence of an additional event; and determining whether the additional trailer event indication is associated with the additional event.

16. The method according to claim 14 comprising:
receiving multiple tow vehicle event indications from a plurality of tow vehicle monitors that monitor a plurality of tow vehicles; and
determining, in response to relationships between the multiple tow vehicle event indication and the detection of the event, which tow vehicle monitor should be paired with the trailer monitor.

17. The method according to claim 14 wherein the event detected by the trailer monitor and indicated by the tow vehicle indication are related to a same operation executed by a driver of the trailer.

18. The method according to claim 14 wherein the event detected by the trailer monitor is detected by a reception of a command conveyed over a communication link.

* * * * *